United States Patent
Chiu et al.

(10) Patent No.: US 10,634,613 B2
(45) Date of Patent: Apr. 28, 2020

(54) MOLYBDENUM DISULFIDE-CONTAINING BIOSENSING CHIP AND DETECTION DEVICE COMPRISING THE BIOSENSING CHIP

(71) Applicant: NATIONAL TAIWAN NORMAL UNIVERSITY, Taipei (TW)

(72) Inventors: Nan-Fu Chiu, Taipei (TW); Ting-Li Lin, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 15/939,319

(22) Filed: Mar. 29, 2018

(65) Prior Publication Data

US 2019/0219504 A1    Jul. 18, 2019

(30) Foreign Application Priority Data

Jan. 15, 2018    (TW) .............................. 107101425 A

(51) Int. Cl.
*G01N 21/552*    (2014.01)
*G01N 21/05*    (2006.01)

(52) U.S. Cl.
CPC ........... *G01N 21/553* (2013.01); *G01N 21/05* (2013.01)

(58) Field of Classification Search
CPC ........... H01L 23/53276; H01L 21/0262; H01L 21/02491; H01L 21/02527; H01L 21/043; H01L 21/044; H01L 21/28512; H01L 29/1606; H01L 29/66045; H01L 29/66742; H01L 29/78684; H01L 29/45; H01L 29/49; G01N 21/553; G01N 21/05
See application file for complete search history.

(56) References Cited

U.S. PATENT DOCUMENTS

| | | | |
|---|---|---|---|
| 7,671,995 B2 | 3/2010 | Lin et al. | |
| 2007/0109541 A1* | 5/2007 | Imato | G01N 21/553 356/445 |
| 2008/0037022 A1* | 2/2008 | Nishikawa | G01N 21/554 356/445 |
| 2008/0135162 A1* | 6/2008 | Sakashita | H01L 21/2007 156/235 |
| 2008/0218761 A1* | 9/2008 | Nishikawa | G01N 21/554 356/445 |
| 2009/0161110 A1* | 6/2009 | Lin | G01N 21/553 356/445 |
| 2010/0274101 A1* | 10/2010 | Lin | A61B 5/0031 600/301 |
| 2012/0064442 A1* | 3/2012 | Kawabata | G03G 5/0525 430/56 |
| 2013/0293896 A1* | 11/2013 | Fujimaki | G01N 21/553 356/445 |

(Continued)

FOREIGN PATENT DOCUMENTS

TW    I304707    12/2008

*Primary Examiner* — Sang H Nguyen

(57) ABSTRACT

A molybdenum disulfide-containing biosensing chip includes a transparent substrate; a metal layer disposed on the transparent substrate; and a molybdenum disulfide layer disposed on the metal layer; wherein the molybdenum disulfide layer is carboxyl (—COOH)-modified. The carboxyl (—COOH)-modified molybdenum disulfide layer effectively enhances sensitivity of a detection device having the biosensing chip. The biosensing chip is applicable to detection of various biological molecules.

20 Claims, 4 Drawing Sheets

(56) References Cited

U.S. PATENT DOCUMENTS

| | | | |
|---|---|---|---|
| 2014/0252342 A1* | 9/2014 | Ramadas | H01L 21/56 257/40 |
| 2014/0315091 A1* | 10/2014 | Yamazaki | H01M 4/621 429/231.8 |
| 2015/0072159 A1* | 3/2015 | Nakamura | H01L 51/0037 428/461 |
| 2015/0109606 A1* | 4/2015 | Peale | H01L 31/1136 356/30 |
| 2015/0159265 A1* | 6/2015 | Kim | C23C 14/542 423/561.1 |
| 2015/0318401 A1* | 11/2015 | Duan | H01L 29/66742 250/200 |
| 2017/0003248 A1* | 1/2017 | Yang | G01N 27/4141 |
| 2017/0053908 A1* | 2/2017 | Hoffman | H01L 27/085 |
| 2017/0096573 A1* | 4/2017 | Matsuno | C23C 22/361 |
| 2017/0102357 A1* | 4/2017 | Liang | G01N 27/4145 |
| 2017/0110538 A1* | 4/2017 | Nirmalraj | H01L 29/24 |
| 2018/0043278 A1* | 2/2018 | Singamaneni | B32B 1/00 |
| 2018/0059051 A1* | 3/2018 | Yang | G01N 27/4145 |
| 2018/0240887 A1* | 8/2018 | Koenig | H01L 29/66037 |
| 2019/0027623 A1* | 1/2019 | Najmaei | H01L 31/0352 |

\* cited by examiner

MOLYBDENUM DISULFIDE-CONTAINING BIOSENSING CHIP AND DETECTION DEVICE COMPRISING THE BIOSENSING CHIP

CROSS-REFERENCE TO RELATED APPLICATION

This non-provisional application claims priority under 35 U.S.C. § 119(a) on Patent Application No(s). 107101425 filed in Taiwan, R.O.C. on Jan. 15, 2018, the entire contents of which are hereby incorporated by reference.

FIELD OF THE INVENTION

The present invention relates to biosensing chips and, more particularly, to a molybdenum disulfide-containing biosensing chip. The present invention further relates to a detection device comprising the biosensing chip.

BACKGROUND OF THE INVENTION

Conventional biological detection techniques involve performing ELISA to study protein specificity. Despite its technological sophistication and findings well recognized among biologists, ELISA requires fluorescent dyes which complicate ELISA. In view of this, it is important to develop novel biosensors.

The tiny sizes of the targets to be sensed by immunoassay biochips which detect biological molecules or sensing chips which detect gas concentration are nowadays reduced to microscale or even nanoscale. Hence, system sensitivity is a key index of competitiveness and reliability of sensors and applications thereof.

Gas and biological molecules detection devices, which involve applying conducting metal oxide nano film to biomedical sensing systems and detecting by surface plasmon resonance (SPR) as to how well specific biological molecules or gas molecules in micro-channels on surfaces of biomedical chips are bound to the chips, are highly sensitive, reliable and practical as well as widely applicable to future development of multichannel, high-throughput detection and high-sensitivity portable instruments, with a view to achieving high sensitivity and high throughput.

In this regard, SPR has advantages as follows: asking no standardization, attaining instant high throughput, and assaying the molecular affinity between a subject under test and biological molecules with just a trace amount of samples to collect quantifiable information about dynamics of intermolecular reactions and thereby serve the purpose of drug discovery instruments or in vitro diagnostics (IVDs).

U.S. Pat. No. 7,671,995 B2 discloses an apparatus of detecting biochemical molecules and gases by using a surface plasmon resonance (SPR) molecular sensing technology, comprising: a coupler; a sensor chip; a cavity space, provided for a reaction of testing molecules; a detector; and an incident light source; wherein the sensor chip further comprises at least one layer of transparent substrate, at least one layer of conducting metal oxide intermediate layer and at least one layer of metal thin film layer.

TW I304707 discloses an organic electroluminescence surface plasmon resonance-based sensing device, comprising: an organic electroluminescence component for providing an excitation source of surface plasmon resonance wave; an insulating layer positioned proximate to a cathode layer of the organic electroluminescence component; and a sensing layer for sensing a target substance, with the sensing layer positioned proximate to the insulating layer or positioned proximate to a substrate of the organic electroluminescence component.

SUMMARY OF THE INVENTION

Conventional biological detection devices which operate by surface plasmon resonance technology still have room for improvement in sensitivity. Therefore, it is an objective of the present invention to provide a biosensing chip conducive to enhancement of the sensitivity of a detection device comprising the biosensing chip.

In order to achieve the above and other objectives, the present invention provides a bio sensing chip, comprising:
a transparent substrate;
a metal layer disposed on the transparent substrate; and
a molybdenum disulfide layer disposed on the metal layer;
wherein the molybdenum disulfide layer is carboxyl (—COOH)-modified.

In an embodiment of the present invention, the transparent substrate is glass substrate, silicon substrate or polymer substrate.

In an embodiment of the present invention, the polymer substrate is polyethylene (PE) substrate, polyvinyl chloride (PVC) substrate, polyethylene terephthalate (PET) substrate, polydimethylsiloxane (PDMS) substrate or poly(methyl methacrylate) (PMMA) substrate.

In an embodiment of the present invention, the metal layer comprises gold, silver, platinum, palladium, copper or aluminum.

In an embodiment of the present invention, the metal layer comprises:
a chromium film or a titanium film disposed on the transparent substrate; and
a gold film disposed on the chromium film or the titanium film.

In an embodiment of the present invention, the gold film is of a thickness of 20 nm~60 nm.

In an embodiment of the present invention, the chromium film or the titanium film is of a thickness of 1 nm~5 nm.

In order to achieve the above and other objectives, the present invention provides a detection device, comprising:
the biosensing chip of the present invention;
a casing for covering the biosensing chip and defining a detection cavity jointly with the biosensing chip, the casing having an inlet and an outlet;
a prism disposed below the biosensing chip;
an emission source disposed below the biosensing chip to emit electromagnetic wave to the biosensing chip; and
a detector disposed below the biosensing chip to detect electromagnetic wave emitted from the biosensing chip by surface plasmon resonance (SPR).

In an embodiment of the present invention, the emission source emits electromagnetic wave with a wavelength of 400 nm~1500 nm.

In an embodiment of the present invention, the emission source emits laser with a wavelength of 690 nm.

In an embodiment of the present invention, the emission source emits electromagnetic wave to the biosensing chip at an angle of incidence of 30° to 80°.

In an embodiment of the present invention, the emission source emits electromagnetic wave to the biosensing chip at an angle of incidence of 40° to 60°.

Compared with conventional biosensing chips, the biosensing chip of the present invention features a carboxyl (—COOH)-modified molybdenum disulfide layer and thus enhances the sensitivity of a detection device comprising the biosensing chip.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
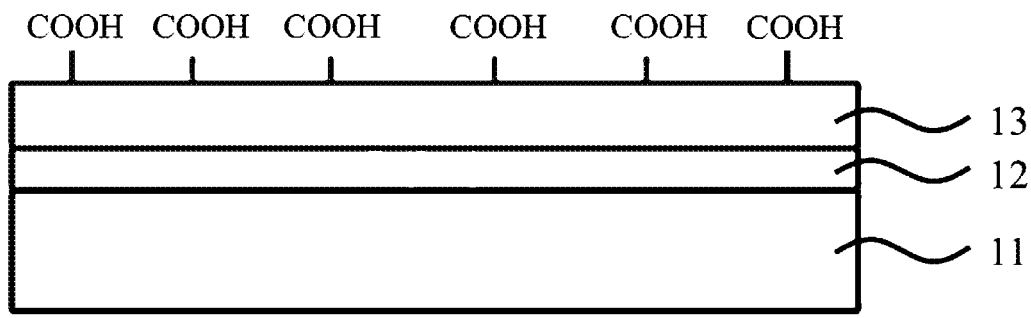
FIG. 1 is a schematic view of a bio sensing chip according to an embodiment of the present invention.

Related layers shown in the drawings of the present invention are adjusted, omitted or simplified in terms of thickness or size for the sake of illustration and clarity. Regarding related components, the drawings of the present invention are not drawn to scale.

Referring to FIG. 1, a biosensing chip 10 of the present invention comprises: a transparent substrate 11; a metal layer 12 disposed on the transparent substrate; and a molybdenum disulfide layer 13 disposed on the metal layer; wherein the molybdenum disulfide layer is carboxyl (—COOH)-modified.

PRODUCTION EXAMPLE 1

Carboxyl-modified Molybdenum Disulfide ($MoS_2$—COOH)

The biosensing chip of the present invention comprises a carboxyl-modified molybdenum disulfide layer. To form the molybdenum disulfide layer, it is feasible to produce a carboxyl-modified molybdenum disulfide aqueous solution by the method of Production Examples 1-1 and 1-2 described below, but the present invention is not limited thereto.

PRODUCTION EXAMPLE 1-1

Oxalic-modified Molybdenum Disulfide

Steps of synthesis: prepare 15 ml of molybdenum disulfide solution of a concentration of 2 mg/ml with deionized water; add 5 mL of hydrogen bromide (HBr) and stir the mixture vigorously for 12 hours; add 1.5 g of oxalic and stir the mixture with a rocker for 4 hours (speed 4); perform centrifugal separation on the evenly mixed solution with a centrifugal separator; replace the supernatant with deionized water, thereby producing a carboxyl-modified molybdenum disulfide aqueous solution ($MoS_2$—COOH (oxalic)).

PRODUCTION EXAMPLE 1-2

Modifying Molybdenum Disulfide with Monochloroacetic Acid (MCA)

Prepare 15 ml of molybdenum disulfide solution of a concentration of 2 mg/ml with deionized water, introduce 1.2 g of sodium hydroxide (NaOH) and 1.0 g of MCA into the molybdenum disulfide solution, allow the mixture to undergo ultrasonic vibration for 1-3 hours, so as for vacancies to form on the surface of $MoS_2$. After the vibration, the evenly mixed solution undergoes centrifugal separation with a centrifugal separator, and then the supernatant is replaced with deionized water, thereby producing MCA-modified carboxyl molybdenum disulfide aqueous solution ($MoS_2$—COOH (MCA))

PRODUCTION EXAMPLE 2

Bare Au Chip

The biosensing chip of the present invention comprises a transparent substrate and a metal layer disposed on the transparent substrate. The transparent substrate and the metal layer are for use in producing a bare Au chip in Production Example 2 described below.

The production process of the bare Au chip in Production Example 2 involves using BK7 glass (18×18 mm, 175 μm) as the transparent substrate, plating BK7 glass with a chromium (Cr) layer of a thickness of 2 nm by an evaporation system, and then plating BK7 glass with a gold (Au) layer of a thickness of 47 nm, so as to form a bare Au chip with a metal layer comprising a chromium film and a gold film. Afterward, the bare Au chip undergoes acetone ultrasonic vibration for 3 minutes, isopropyl alcohol ultrasonic vibration for 3 minutes, and deionized water (D. I. water) ultrasonic vibration for 3 minutes sequentially for surface cleaning, and then the chip surface is dried with a nitrogen gas current.

In Production Example 2, the chromium film serves to enhance adhesiveness of the gold film, but the present invention is not limited thereto. The step of plating chromium may be dispensed with such that the transparent substrate is directly plated with a precious metal (i.e., gold, silver, platinum, or palladium), copper or aluminum. In a variant embodiment, a titanium film substitutes for the chromium film.

In Production Example 2, BK7 glass functions as a transparent substrate, but the present invention is not limited thereto, and thus any other conventional transparent substrate is applicable to the present invention. For example, the transparent substrate is glass substrate, silicon substrate or polymer substrate (such as polyethylene (PE) substrate, polyvinyl chloride (PVC) substrate, polyethylene terephthalate (PET) substrate, polydimethylsiloxane (PDMS) substrate or poly(methyl methacrylate) (PMMA) substrate).

In Production Example 2, the gold film is of a thickness of 47 nm such that surface plasmon resonance is optimal at an incident wavelength of 690 nm, but the present invention is not limited thereto. Preferably, the gold film has a thickness of 20 nm~60 nm. Preferably, the chromium film has a thickness of 1 nm~5 nm.

Embodiment 1: Oxalic-modified molybdenum disulfide chip ($MoS_2$—COOH (oxalic) chip)

Embodiment 1-1

500 μL of 5 mM cystamine (Cys) solution is transported to the surface of the bare Au chip of Production Example 2 with a pipette and then stands still for 24 hours. Afterward, the chip surface is cleaned with deionized water and then dried with a nitrogen spray gun, so as to form a Au/Cys chip. Afterward, 500 μL of 0.5 mg/mL $MoS_2$—COOH (Oxalic) solution of Production Example 1-1 is transported to the Au/Cys chip surface with the pipette and stands still for 5 hours. Afterward, the chip surface is cleaned with deionized water and then dried with a nitrogen spray gun, so as to finalize the production of the biosensing chip of Embodiment 1-1.

Embodiment 1-2

Embodiment 1-2 is substantially identical to Embodiment 1-1 in terms of the production process of the biosensing chip, except that the concentration of the $MoS_2$—COOH (oxalic) solution of Embodiment 1-2 is different from that of Embodiment 1-1, that is, 1 mg/mL.

Embodiment 2: MCA-modified molybdenum disulfide chip ($MoS_2$—COOH (MCA) chip)

Embodiment 2-1

500 μL of 5 mM cystamine (Cys) solution is transported to the surface of the bare Au chip of Production Example 2 with the pipette and stands still for 24 hours Afterward, the chip surface is cleaned with deionized water and then dried with a nitrogen spray gun, so as to form a Au/Cys chip. Then, 500 μL of 0.5 mg/mL MoS2—COOH (MCA) solution of Production Example 1-2 is transported to Au/Cys chip surface with the pipette and stands still for 5 hours. Afterward, the chip surface is cleaned with deionized water and then dried with a nitrogen spray gun, so as to finalize the production of the biosensing chip in Embodiment 2-1.

Embodiment 2-2

Embodiment 2-2 is substantially identical to Embodiment 2-1 in terms of the production process of the biosensing chip, except that the concentration of the $MoS_2$—COOH (MCA) solution of Embodiment 2-2 is different from that of Embodiment 2-1, that is, 1 mg/mL.

Both Embodiment 1 and Embodiment 2 involve fixing a molybdenum disulfide layer to a metal layer surface by a chemical linker provided in the form of cystamine (Cys), but the present invention is not limited thereto, and thus any other compound, for example, cysteamine (CA), 8-mercaptooctanoic acid (8-MOA), 6-mercaptohexanoic acid (6-MHA), captopropionic acid (3-MPA) and octadecanethiol (ODT), may function as a linker.

In addition to the chemical linker, the molybdenum disulfide can be fixed to the metal layer surface by physical and chemical methods well known among persons skilled in the art as follows:

1. Adsorption: the molybdenum disulfide molecules are physically fixed to the metal layer surface by hydrophilicity, hydrophobicity and charging, such as electrostatic forces, π-π stacking, and van der Waals forces. Electrostatic forces which originate from the metal layer surface are enhanced by oxygen plasma ($O_2$ plasma) or UV-ozone ($O_3$).
2. Covalent bonding: covalent bonding is effectuated by activating a group on the molybdenum disulfide molecule and a specific group of the metal layer surface.
3. Entrapment: molybdenum disulfide is enclosed by a thin-film coated on the metal layer surface.
4. Cross-linking: like entrapment, cross-linking involves using a crosslinking agent to form a three-dimensional structure as a result of a reaction between the cross-linking agent and the thin-film on the metal layer surface, such that molybdenum disulfide is fixed in place in the three-dimensional structure.
5. Biological binding: molybdenum disulfide and the metal layer surface are bound together by active biological molecules of specificity.

COMPARISON EXAMPLE 1

Traditional Surface Plasmon Resonance (SPR) Chip

A bare Au chip is immersed in 1 mM 8-mercaptooctanoic acid (MOA) solution and stands still in a refrigerator for 24 hours before being taken out. Afterward, any MOA whose surface has not yet been completely bonded is rinsed and removed with 95% ethanol, and then the surface is dried with a nitrogen spray gun. At this point in time, the metal layer surface is covered with carboxyl (—COOH) and thus known as a traditional SPR chip.

TEST EXAMPLE

A test is performed on the biosensing chip of Embodiment 2-1 and the traditional surface plasmon resonance (SPR) chip of Comparison Example 1 as follows:

Bovine serum albumin (BSA) and bovine serum albumin antibody (Anti-BSA) undergo immunological reactions with the chip of Comparison Example 1 and the chip of Embodiment 2-1, respectively, and the results are compared. The Test Example requires a flow rate of 6 μL/min and a feed of 20 μL and involves activating the carboxyl (—COOH) of the chip surfaces with 1-Ethyl-3-(3-dimethylaminopropyl)carbodiimide (EDC)/N-Hydroxysuccinimide (NHS) to fix 100 μg/mL BSA in place by covalent bonding, filling vacancies of non-bonded BSA with 1 mM ethyl acetate (EA)-HCl which functions as a blocker, observing variations in the resonance angle of Anti-BSA of different concentrations (100 μg/mL, 50 μg/mL, 25 μg/mL, 10 μg/mL, 5 μg/mL, 1 μg/mL), and testing samples of different concentrations with 10 mM NaOH which functions as a dissociating agent.

Figure 2:
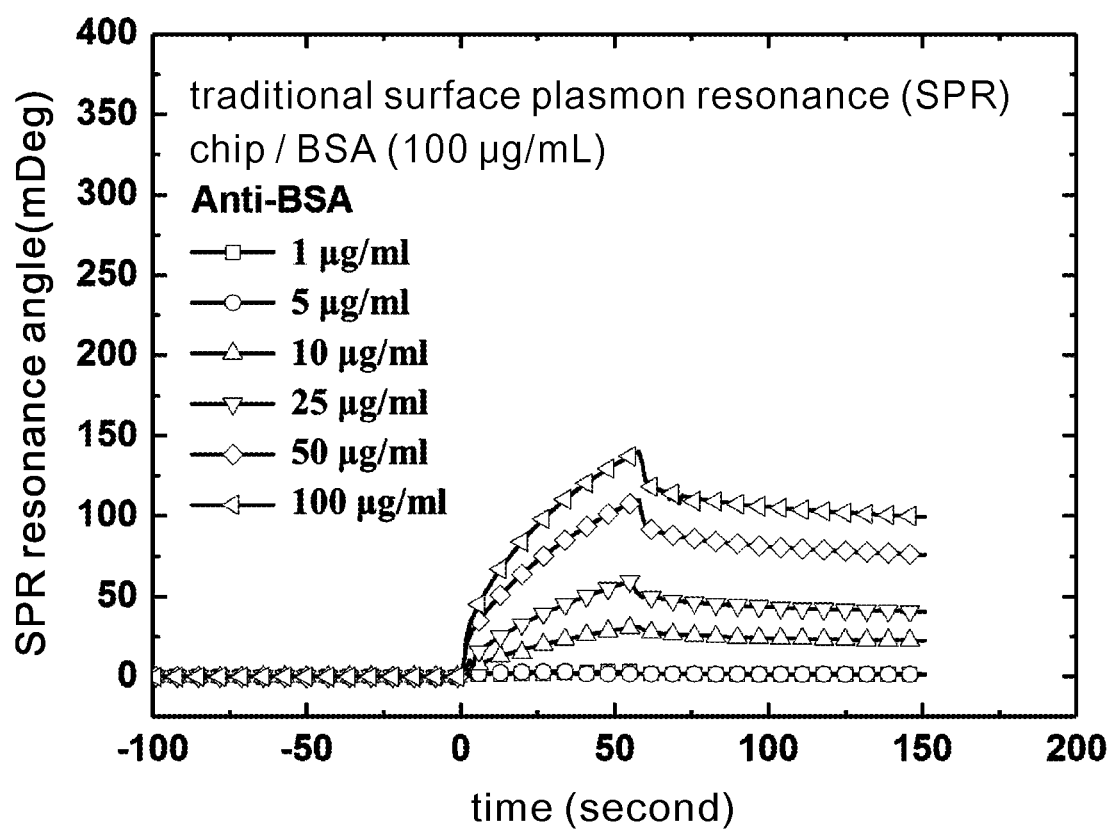
FIG. 2 are graphs of SPR angle against time, showing test results of variations in SPR resonance angle between BSA antigen protein and the chip of Comparison Example 1.
Figure 3:
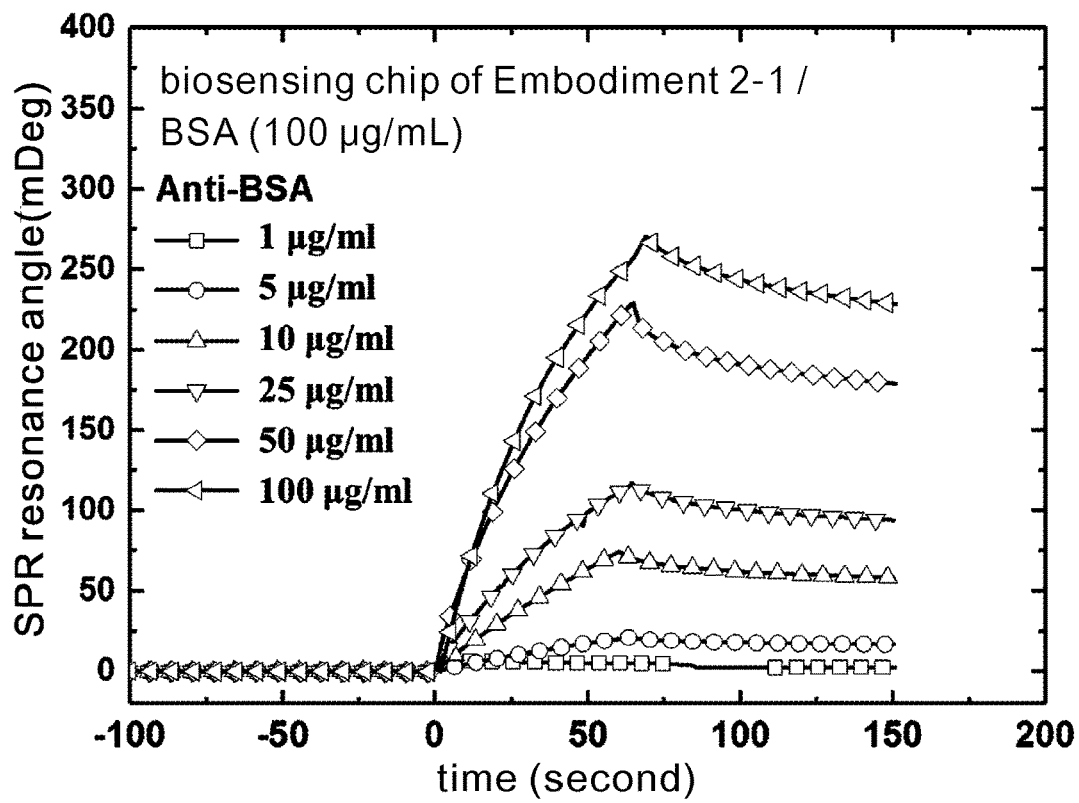
FIG. 3 are graphs of SPR angle against time, showing test results of variations in SPR resonance angle between BSA antigen protein and the chip of Embodiment 2-1.

The test results of the Test Example are shown in FIG. 2 through FIG. 5. FIG. 2 and FIG. 3 are graphs of SPR angle against time, showing test results of variations in SPR resonance angle between BSA antigen protein and the chip of Comparison Example 1 and Embodiment 2-1, respectively.

The Test Example involves inspecting samples with a small feed (20 μL) at a low flow rate (6 μL/min). As shown in FIG. 2, the SPR resonance angle of 100 μg/mL BSA for use in inspection of the chip of Embodiment 2-1 is 78.79 mDeg, demonstrating high affinity toward protein. As shown in FIG. 3, the SPR resonance angle of 100 μg/mL BSA for use in inspection of the traditional SPR chip of Comparison Example 1 is just 54.19 mDeg. As revealed by the test results of the Test Example, the chip of Embodiment 2-1 is 1.45 times higher in sensitivity than the traditional SPR chip of Comparison Example 1.

Figure 4:
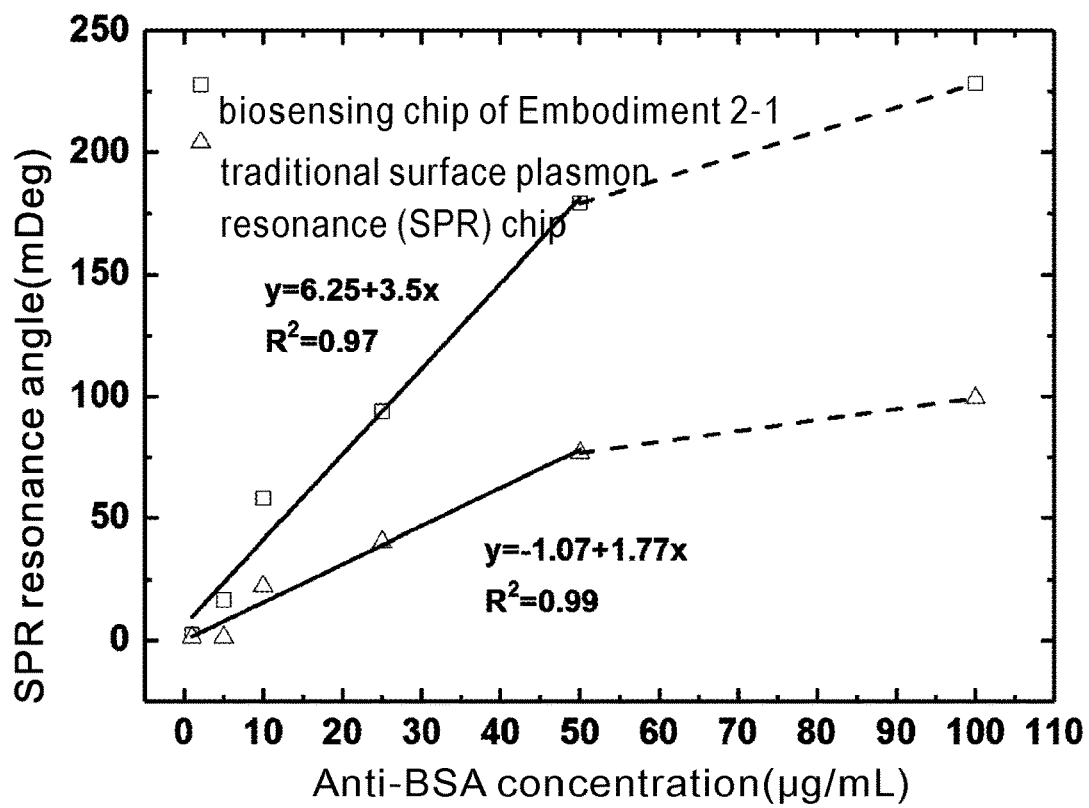
FIG. 4 are graphs of SPR angle against anti-BSA concentration, showing linear regression curves of real-time test results of FIG. 2 and FIG. 3.
Figure 5:
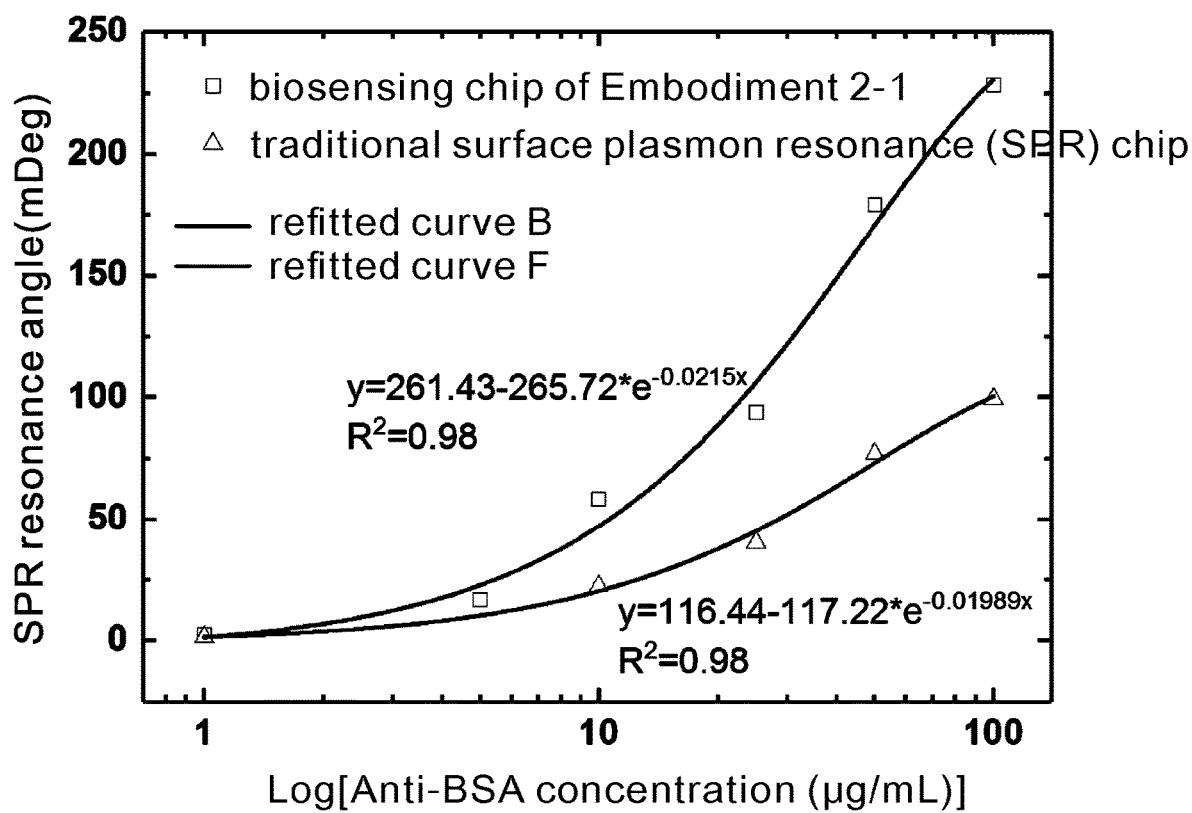
FIG. 5 are log graphs of SPR angle against anti-BSA concentration, showing exponentially refitted regression curves of real-time test results of FIG. 2 and FIG. 3.

Upon completion of the comparison of BSA antigen protein (Anti-BSA) and the chip in the SPR resonance angle, immunological experiments are conducted on bovine serum albumin (BSA) antigen-antibody of different concentrations, and the results are shown in FIG. 4. FIG. 4 are graphs of SPR angle against anti-BSA concentration, showing linear regression curves of real-time test results of FIG. 2 and FIG. 3. Referring to FIG. 4, it reveals that the biosensing chip of Embodiment 2-1 has a regression coefficient $R^2$=0.97 which is lower than the regression coefficient $R^2=0.99$ of the traditional surface plasmon resonance (SPR) chip. However, the biosensing chip of Embodiment 2-1 has a slope of 3.5, which is nearly 2 times greater than that of the traditional surface plasmon resonance (SPR) chip. Hence, given the same concentration, the traditional surface plasmon resonance (SPR) chip has a smaller resonance angle than the biosensing chip of Embodiment 2-1. As the 100 μg/mL Anti-BSA is saturated in concentration, a concentration of 50 μg/mL is used as a reference for the sake of comparison. Assuming that Anti-BSA has a concentration of 50 μg/mL, the biosensing chip of Embodiment 2-1 is 2.35 times higher in sensitivity than the traditional surface plasmon resonance (SPR) chip. Hence, it proves once again that the biosensing chip of Embodiment 2-1 has a higher sensitivity. FIG. 5 shows regression coefficients of $R^2=0.98$ by exponential refitting.

With reference to the test results of the Test Example, the biosensing chip of the present invention features a carboxyl (—COOH)-modified molybdenum disulfide layer and thereby effectively enhances the sensitivity of a detection device having the biosensing chip, when compared with the traditional surface plasmon resonance (SPR) chip.

Embodiment 3: detection device

Figure 6:
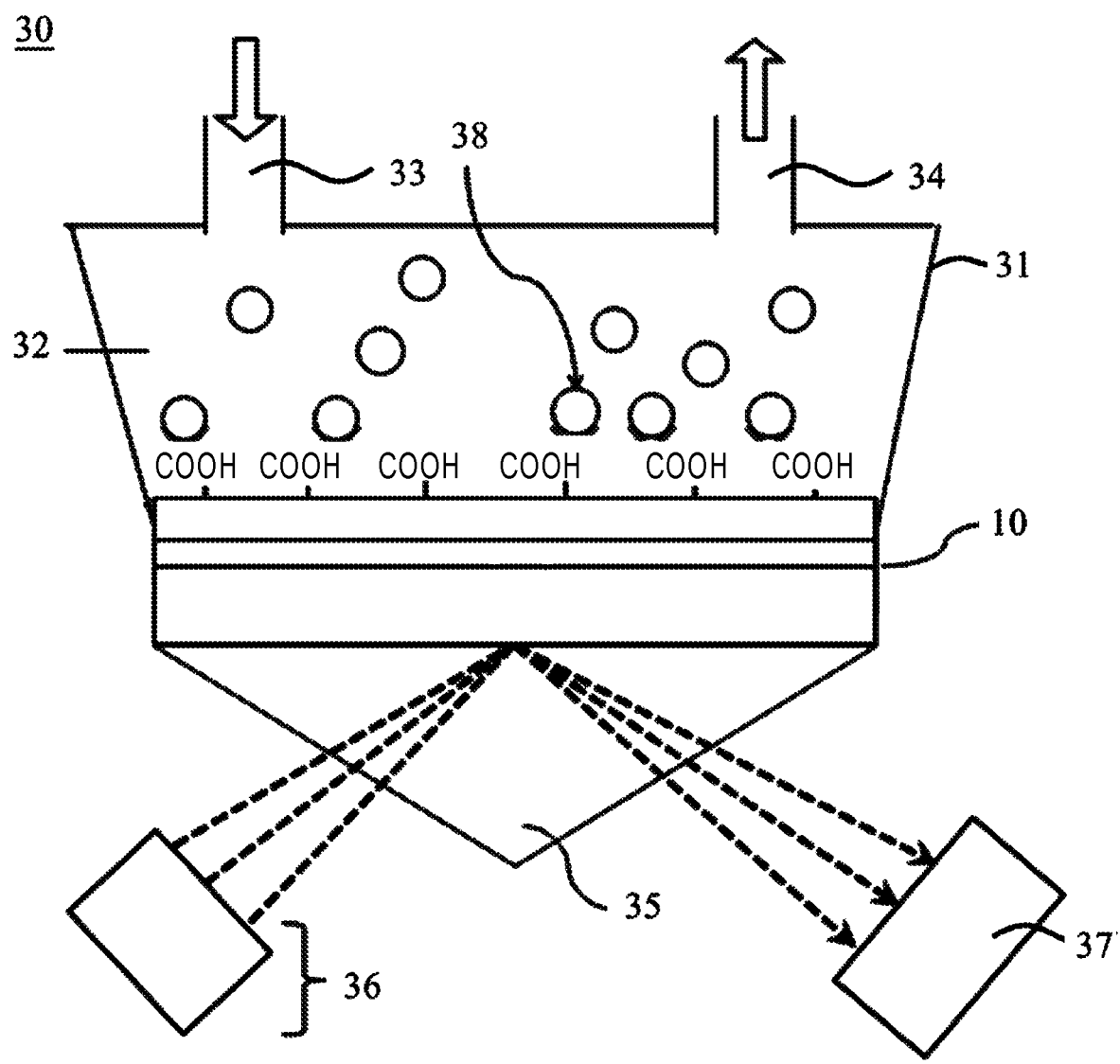
FIG. 6 is a schematic view of a detection device according to an embodiment of the present invention.

FIG. 6 is a schematic view of a detection device according to an embodiment of the present invention. As shown in FIG. 6, a detection device 30 of the present invention comprises: the biosensing chip 10; a casing 31 for covering the biosensing chip 10 and defining a detection cavity 32 jointly with the biosensing chip 10, with the casing 31 having an inlet 33 and an outlet 34; a prism 35 disposed below the biosensing chip 10; an emission source 36 disposed below the biosensing chip 10 to emit electromagnetic wave to the biosensing chip 10; and a detector 37 disposed below the biosensing chip 10 to detect electromagnetic wave emitted from the biosensing chip 10 by surface plasmon resonance (SPR).

In an embodiment of the present invention, the emission source 36 in the detection device 30 not only controls factors in variation of an incident angle but also controls the wavelength of the incident light. In this regard, the embodiment of the present invention is not restrictive of the wavelength and intensity of the incident light; for example, the incident light is visible light or near infrared with a wavelength of 400 nm to 1500 nm and undergoes division and modulation. In a preferred scenario, the incident light is a laser beam with a wavelength of 690 nm, whereas the angle of incidence of the incident light is 30° to 80°, preferably 40° to 60°.

Referring to FIG. 6, in practice, a solution which contains target-carrying molecules 38 is introduced into the detection cavity 32 through the inlet 33 and discharged from the detection cavity 32 through the outlet 34. The bonding of the target-carrying molecules 38 and the biosensing chip 10 causes a change in SPR resonance angle. The detector 37 detects the variations in the SPR resonance angle and thus assesses the quantity of the target-carrying molecules 38 in the solution.

The present invention is disclosed above by preferred embodiments. However, persons skilled in the art should understand that the preferred embodiments are illustrative of the present invention only, but shall not be interpreted as restrictive of the scope of the present invention. Hence, all equivalent modifications and replacements made to the aforesaid embodiments shall fall within the scope of the present invention. Accordingly, the legal protection for the present invention shall be defined by the appended claims.

What is claimed is:

1. A biosensing chip for surface plasmon resonance, comprising:
   a transparent substrate;
   a metal layer disposed on the transparent substrate; and
   a molybdenum disulfide layer disposed on the metal layer;
   wherein the molybdenum disulfide layer is carboxyl (—COOH)-modified, and
   wherein the metal layer is disposed between the transparent substrate and the molybdenum disulfide layer, and the molybdenum disulfide layer is free of contact with the transparent substrate.

2. The biosensing chip of claim 1, wherein the transparent substrate is one of glass substrate, silicon substrate, and polymer substrate.

3. The biosensing chip of claim 2, wherein the polymer substrate is one of polyethylene (PE) substrate, polyvinyl chloride (PVC) substrate, polyethylene terephthalate (PET) substrate, polydimethylsiloxane (PDMS) substrate, and poly (methyl methacrylate) (PMMA) substrate.

4. A detection device, comprising:
   the biosensing chip of claim 2;
   a casing for covering the biosensing chip and defining a detection cavity jointly with the biosensing chip, the casing having an inlet and an outlet;
   a prism disposed below the biosensing chip;
   an emission source disposed below the biosensing chip to emit electromagnetic wave to the biosensing chip; and
   a detector disposed below the biosensing chip to detect electromagnetic wave emitted from the biosensing chip by surface plasmon resonance (SPR).

5. The detection device of claim 4, wherein the emission source emits electromagnetic wave with a wavelength of 400 nm~1500 nm.

6. The detection device of claim 4, wherein the emission source emits electromagnetic wave to the biosensing chip at an angle of incidence of 30° to 80°.

7. The biosensing chip of claim 1, wherein the metal layer comprises one of gold, silver, platinum, palladium, copper, and aluminum.

8. A detection device, comprising:
   the biosensing chip of claim 7;
   a casing for covering the biosensing chip and defining a detection cavity jointly with the biosensing chip, the casing having an inlet and an outlet;
   a prism disposed below the biosensing chip;
   an emission source disposed below the biosensing chip to emit electromagnetic wave to the biosensing chip; and
   a detector disposed below the biosensing chip to detect electromagnetic wave emitted from the biosensing chip by surface plasmon resonance (SPR).

9. The detection device of claim 8, wherein the emission source emits electromagnetic wave with a wavelength of 400 nm~1500 nm.

10. The detection device of claim 8, wherein the emission source emits electromagnetic wave to the biosensing chip at an angle of incidence of 30° to 80°.

11. The biosensing chip of claim 1, wherein the metal layer comprises:
    a chromium film or a titanium film disposed on the transparent substrate; and
    a gold film disposed on the chromium film or the titanium film.

12. The biosensing chip of claim 11, wherein the gold film is of a thickness of 20 nm~60 nm.

13. A detection device, comprising:
the biosensing chip of claim 12;
a casing for covering the biosensing chip and defining a detection cavity jointly with the biosensing chip, the casing having an inlet and an outlet;
a prism disposed below the biosensing chip;
an emission source disposed below the biosensing chip to emit electromagnetic wave to the biosensing chip; and
a detector disposed below the biosensing chip to detect electromagnetic wave emitted from the biosensing chip by surface plasmon resonance (SPR).

14. The biosensing chip of claim 11, wherein the chromium film or the titanium film is of a thickness of 1 nm~5 nm.

15. A detection device, comprising:
the biosensing chip of claim 11;
a casing for covering the biosensing chip and defining a detection cavity jointly with the biosensing chip, the casing having an inlet and an outlet;
a prism disposed below the biosensing chip;
an emission source disposed below the biosensing chip to emit electromagnetic wave to the biosensing chip; and
a detector disposed below the biosensing chip to detect electromagnetic wave emitted from the biosensing chip by surface plasmon resonance (SPR).

16. The detection device of claim 15, wherein the emission source emits electromagnetic wave with a wavelength of 400 nm~1500 nm.

17. The detection device of claim 15, wherein the emission source emits electromagnetic wave to the biosensing chip at an angle of incidence of 30° to 80°.

18. A detection device, comprising:
the biosensing chip of claim 1;
a casing for covering the biosensing chip and defining a detection cavity jointly with the biosensing chip, the casing having an inlet and an outlet;
a prism disposed below the biosensing chip;
an emission source disposed below the biosensing chip to emit electromagnetic wave to the biosensing chip; and
a detector disposed below the biosensing chip to detect electromagnetic wave emitted from the biosensing chip by surface plasmon resonance (SPR).

19. The detection device of claim 18, wherein the emission source emits electromagnetic wave with a wavelength of 400 nm~1500 nm.

20. The detection device of claim 18, wherein the emission source emits electromagnetic wave to the biosensing chip at an angle of incidence of 30° to 80°.

* * * * *